Sept. 20, 1971 H. HACK 3,605,502
BALANCING MACHINE
Filed March 12, 1969 3 Sheets-Sheet 1

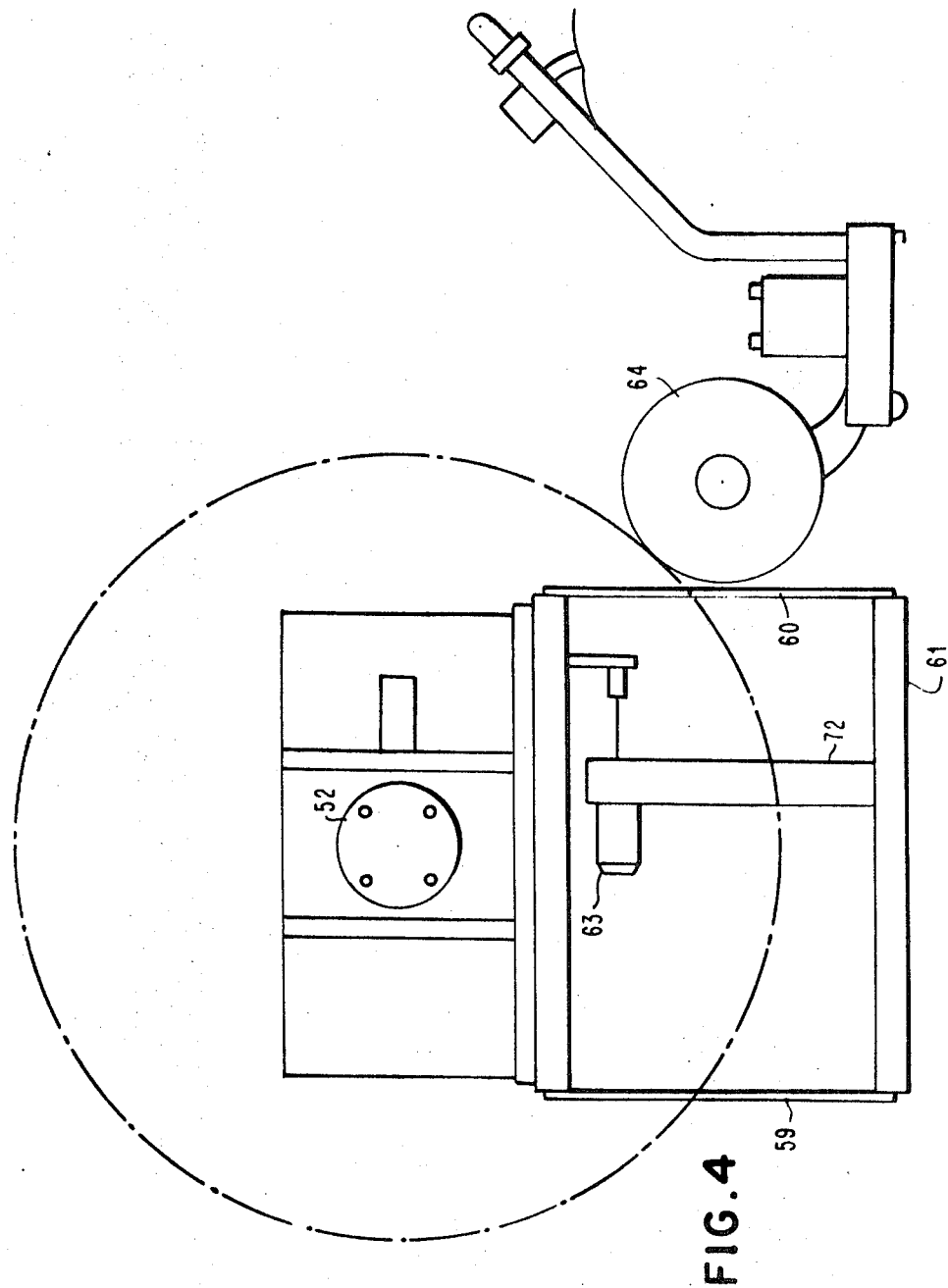

United States Patent Office

3,605,502
Patented Sept. 20, 1971

3,605,502
BALANCING MACHINE
Heinrich Hack, Spachbrucken, Germany, assignor to Carl Schenck Maschinenfabrik G.m.b.H., Darmstadt, Germany
Filed Mar. 12, 1969, Ser. No. 806,621
Claims priority, application Germany, Mar. 12, 1968, P 16 98 164.9
Int. Cl. G01m 1/22
U.S. Cl. 73—471                                 6 Claims

ABSTRACT OF THE DISCLOSURE

A machine is disclosed, having a spring-mounted mechanical frame for the dynamic balancing of bodies along at least two balancing planes thereof. The location and the measuring of imbalances independently in different planes of a body to be balanced, is accomplished by the provision of at least two sets of spring assemblies, wherein one spring assembly is disposed parallel to the rotational axis of the body to be balanced, permitting the parallel displacement of the axis, and the second assembly contains at least two elongated springs disposed with the extensions of their longitudinal axes intersecting in a given balancing plane of the body. Suitably each spring assembly contains leaf springs, torsion bars, or the like resilient members. When leaf springs are used, a pair of springs is disposed parallel to the rotational axis, and is suitably disposed at 90° from the position of a pair of springs inclined toward one another and the extensions of their longitudinal axes intersecting each other to bring about a corresponding 90° shift in the measurement of the oscillations caused by the imbalances in the different balancing planes.

---

The present invention relates to a machine for the dynamic balancing of bodies, more particularly the present invention relates to a balancing machine with a mechanical frame, for the balancing of bodies along at least two balancing planes.

When it is desired to equalize the imbalances in more than one balancing plane of a rotating, rigid body, it is necessary that one be able to determine the magnitude and location of any imbalance in one of the balancing planes, without any interference from imbalances that may exist in another balancing plane. This has been accomplished in the prior art, for example, by the use of balancing machines that are journalled in two locations, wherein these locations are alternately arrested. This method can be used only when the plane of the journalled location coincides with the plane of the body that is balanced at that time. Balancing machines have been built with mechanical frames to avoid the difficulties that arise, such as when the balancing planes do not coincide with the planes of the journalled locations. The mechanical frames oscillate along with the body to be balanced and, therefore, make the measurement of the imbalances more difficult, and limits the usefulness of such machines, particularly when used for balancing bodies of widely varying diameter. Another drawback of such machines is presented by the need alternately to arrest and make free for rotation the rotating axis of the body to be balanced, a procedure which can introduce errors into the process.

It is an object of the present invention to provide a balancing machine, the operation of which is free from the drawbacks of prior art machines.

It is a further object of the present invention to provide a balancing machine free of sources of error in the measurement, such as the effect of loose bearings and erroneous operation of the arresting mechanism.

According to yet another object of the present invention, a balancing machine is provided wherein construction of the mechanical frame does not present a limitation to the diameter of the body to be balanced, the body to be balanced is easily accessible and exchangeable, and independent measurement along at least two balancing planes is made possible.

In accordance with the present invention there is provided in a balancing machine for the rotary balancing of a body along at least two of its planes, the improvement which comprises a first spring assembly for accommodating the parallel displacement of the rotational axis of the body to be balanced, upon an imbalance creating a first force during the rotation thereof, and a second spring assembly for permitting a limited rocking displacement responsive to a second force created during the rotation by all but one of the planes of the body to be balanced. The balancing machine of the present invention is comprised of a mechanical frame wherein the first spring assembly is disposed for guiding parallel displacement of the rotational axis of the body to be balanced, and the second spring aassembly is comprised of at least two elongated springs disposed with the extensions of their longitudinal axes intersecting in a plane along which the body is to be balanced, for guiding a limited rocking displacement of the body to be balanced, perpendicularly to its axis of rotation.

Suitably, the spring assemblies each are formed from a pair of leaf springs, wherein the springs of the first assembly permit parallel movement of the rotational axis of the body to be balanced, while the springs of the second assembly are mounted on the first spring assembly, and are disposed with their longitudinal axes inclined towards one another to provide for the limited rocking motion responsive to the forces occurring only in one plane of the body to be balanced, while the body is rotated. Movement in this limited direction will result in a rocking motion of the axis of rotation of the body to be balanced.

According to a further feature of the present invention, the second spring assembly is suitably mounted onto the first spring assembly by being shifted 90° relative to each other, so that each of the sensors used for monitoring the displacement of each of the spring assemblies will measure these dislocations in a corresponding phase shift. Suitably, a switch is provided which, when in one position, permits measurement of the position and magnitude of imbalance which is in a plane other than that in which an imbalance brings about a displacement of the upper, the second spring assembly. After these imbalances have been determined and equalized, the switch is placed in its other position and the imbalances that are registered by displacement of the second spring assembly, can be determined and equalized.

A computing system is provided in which, suitably, the signal corresponding to the total imbalance of the body is fed through a unit which will shift its phase by 90°, and then the signal indicating the magnitude and position of imbalance which can be equalized in a given plane, can be vectorially added through a potentiometer in a computing unit to the signal from another balancing plane, so that at the output of the computing unit the imbalances which exist alone in the plane coinciding with the point of intersection of the springs in the second spring assembly, can be obtained both as to their magnitude and their angular location.

Further details of the present invention are given in the following detailed disclosure, with reference being had to the drawing wherein:

FIG. 4 is a schematic front elevational view of the embodiment shown in FIG. 3.

Figure 1:
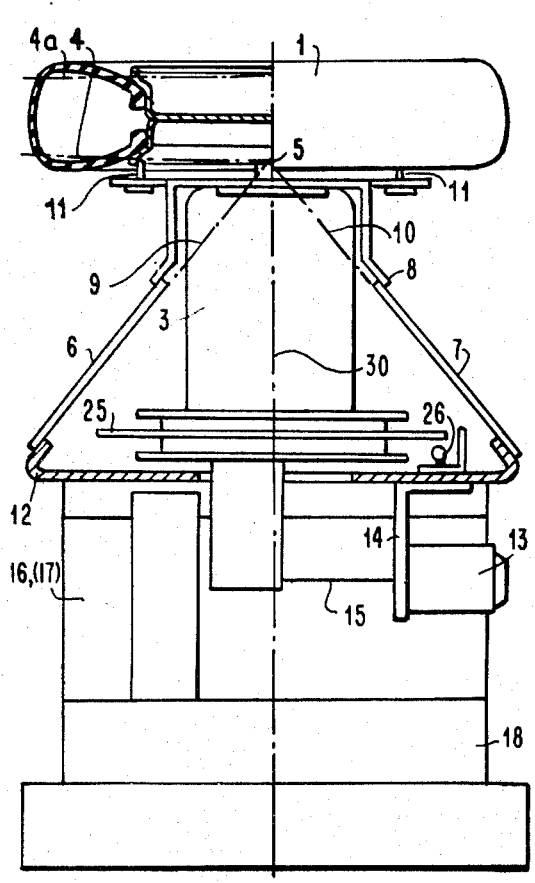
FIG. 1 is a schematic front elevational view of an embodiment of the balancing machine of the present invention.
Figure 2:
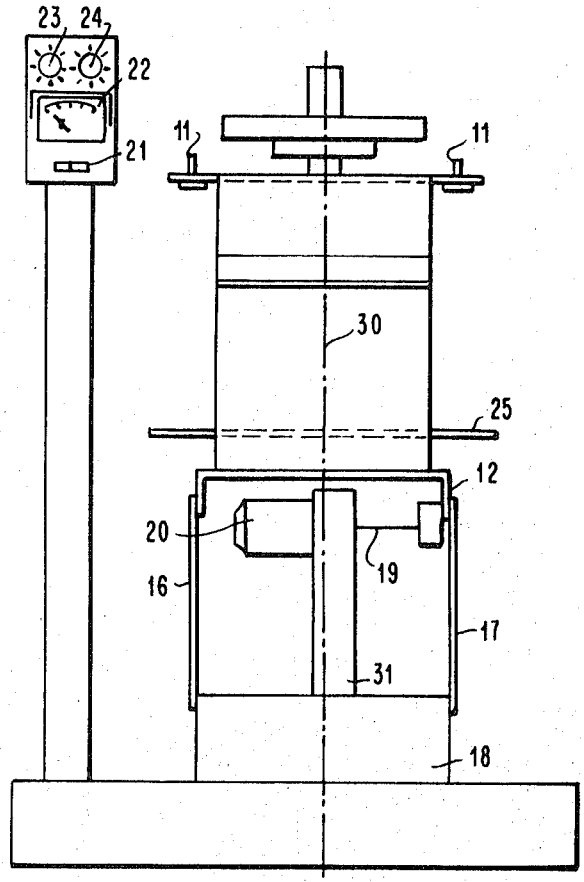
FIG. 2 is a schematic side elevational view of the embodiment shown in FIG. 1.

In the embodiment of the invention shown in FIGS. 1 and 2, a body to be balanced is mounted for rotation onto a mounting assembly 2 attached to the shaft of a motor 3. The plane 4 of the body to be balanced, onto which the balancing weights are to be affixed, is coincident with the point of intersection 5 formed by the extension of the longitudinal axes of leaf springs 6 and 7 which are inclined toward one another. The springs 6 and 7 are attached at their respective upper ends to a motor mount 8, and their respective lower ends are mounted on an intermediate mounting plate 12. A transducer or sensor 13 is attached to the mounting plate 12 by means of a bracket 14.

The motor mount 8 which is carried by the leaf springs 6 and 7 suspends the motor 3 for displacement together with the displacement of these springs. A striker bar 15 is mounted on the motor 3. As the body to be balanced is rotated, any imbalance located in a plane of the body, other than the plane 4 in which the spring axis intersection 5 is disposed, such as an imbalance in the plane 4a, results in a displacement of the motor, leaf springs, and the striker bar, and the bar creates a signal in the sensor 13. An imbalance in the plane 4 will not affect the signal created by an imbalance in the plane 4a through the sensor 13.

As shown in FIG. 2, the intermediate mounting plate 12 rests on vertical leaf springs 16 and 17 which are disposed parallel to each other. The respective lower edges of these leaf springs are attached to a base plate 18. In the embodiment of the invention shown in FIGS. 1 and 2, the parallel leaf springs 16 and 17 are displaced by 90° relative to the inclined leaf springs 6 and 7. Due to the parallel disposition of the leaf springs 16 and 17 the rotational axis of the mounting assembly for the body to be balanced, can become displaced by any imbalances only parallel to its normal position. These displacements are registered by means of a striker bar 19 which is mounted on the rotational axis, creating a signal from a sensor 20. The sensor is shown mounted from the base plate by a bracket 31. Thus the imbalance signals created in the sensor 13 contain the information about all imbalances in the balancing plane 4a and in all other planes, except in plane 4, of the body to be balanced, and the signal from the sensor 20 contains information about the sum total of the imbalances at all planes of the body to be balanced.

As shown in FIGS. 1 and 2, radially and axially adjustable mounting abutments 11 are carried by the motor mount 8 to assist in establishing the correct positioning of the axis about which the plane 4a is rocking to coincide with the point of intersection 5 which is also the axis of the rocking motion. A body to be balanced, having a diameter of any size, is placed on these mounting abutments, and is then axially adjusted until the intersection 5 lies in the balancing plane. When bodies are balanced with balancing weights that are equal with respect to the distance between the center of gravity thereof and the balancing plane, this fixed distance can be taken into consideration at the time the balancing plane is adjusted.

Suitably, the signal from the sensor 13, concerning the imbalance in the balancing plane 4a, is displayed on a meter 22 which is preferably calibrated in units corresponding to the amount of imbalance. The ratio of the equalization weight and measuring scale units can be adjusted by potentiometers 23 and 24. The angular location of the imbalances which are to be equalized are indicated on a circular scale (not shown) which synchronously rotates with the body to be balanced. The locations are indicated on the scale by a stroboscope lamp 26 guided by the imbalance signals from the sensor 13.

After the first measurement has been completed, the body to be balanced is rotated until a pointer (not shown) which is firmly attached to the machine, is aligned with the angular position on the scale, that was illuminated during the measurement by the stroboscope lamp. The position at which the equalization weight has to be applied to the body, can thus be easily ascertained.

After equalization of the imbalances has been accomplished along the plane 4a, the switch 21 is turned to its alternate position whereby, upon the rotation of the body, the imbalances in the balancing plane 4 are obtained through the sensor 20. The remainder of the procedure is carried out in a similar manner as described above with reference to the equilization of imbalances in the plane 4a.

Figure 5:
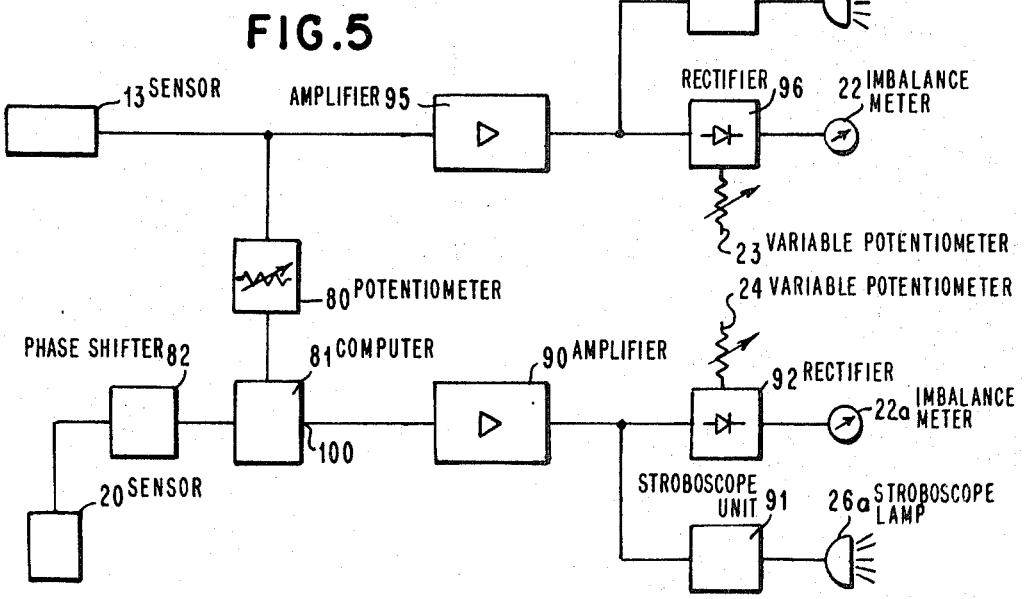
FIG. 5 is a schematic illustration of a measuring assembly for the simultaneous indication of imbalance in two planes of a body to be balanced.

In place of the indicator arrangement shown in and described in connection with FIG. 2, an indicating and computing system can be used, as shown in FIG. 5. The imbalance the data obtained from the sensors 13 and 20, are fed into the system and are treated therein to obtain the information necessary for separate equalization in each balancing plane. This information includes both the amount of imbalance that is to be equalized and the angular position of the imbalance.

The system shown in and described in connection with FIG. 2, permits the simple separate determination of the imbalances in each of the balancing planes of the body, both as to the magnitude and to the angular location of the imbalances. The system shown in and described in connection with FIG. 5, permits the simultaneous—or if desired, separate—determination of the imbalances in two balancing planes, both as to the magnitude and to the angular location of the imbalances.

In the system shown in FIG. 5, the signal from the sensor 20 is fed through a suitable 90° phase shifter 82 to a computer 81. The signal from the sensor 13, concerning the imbalances in the balancing plane 4a, is fed through a selectively operating amplifier 95, to a stroboscope unit 97 and then to a stroboscope lamp 26 connected thereto. The signal from the amplifier 95 is also fed to a rectifier 96 having an adjusting potentiometer 23 and to a meter 22 to obtain a reading of the imbalance in the balancing plane 4a.

The signal from the sensor 13 is also fed through a potentiometer 80 to the computer 81. The computer performs a vectorial summation of the signal emanating from the sensor 20, which contains information about all of the imbalances in the body to be balanced, and of the signal from the sensor 13, which contains the information concerning the imbalances in the balancing plane 4a of the body. The resultant signal from the computer 81, at 100, contains the information about the imbalances in the balancing plane 4, both as to the magnitude and as to the angular position of these imbalances. This signal is fed through a selectively operating amplifier 90 to a stroboscope unit 91 and a stroboscope lamp 26a connected thereto. The computer output signal at 100 is also fed to a rectifier 92 having an adjusting potentiometer 24, and then to a meter 22a to obtain a reading of the imbalance in the balancing plane 4.

As will be readily apparent to a man of skill in the art, the signals from the sensors, concerning the imbalances in the two planes, can also be processed by other systems than the one shown in FIG. 5, for example, by systems which operate on the same principle as a wattmeter.

Figure 3:
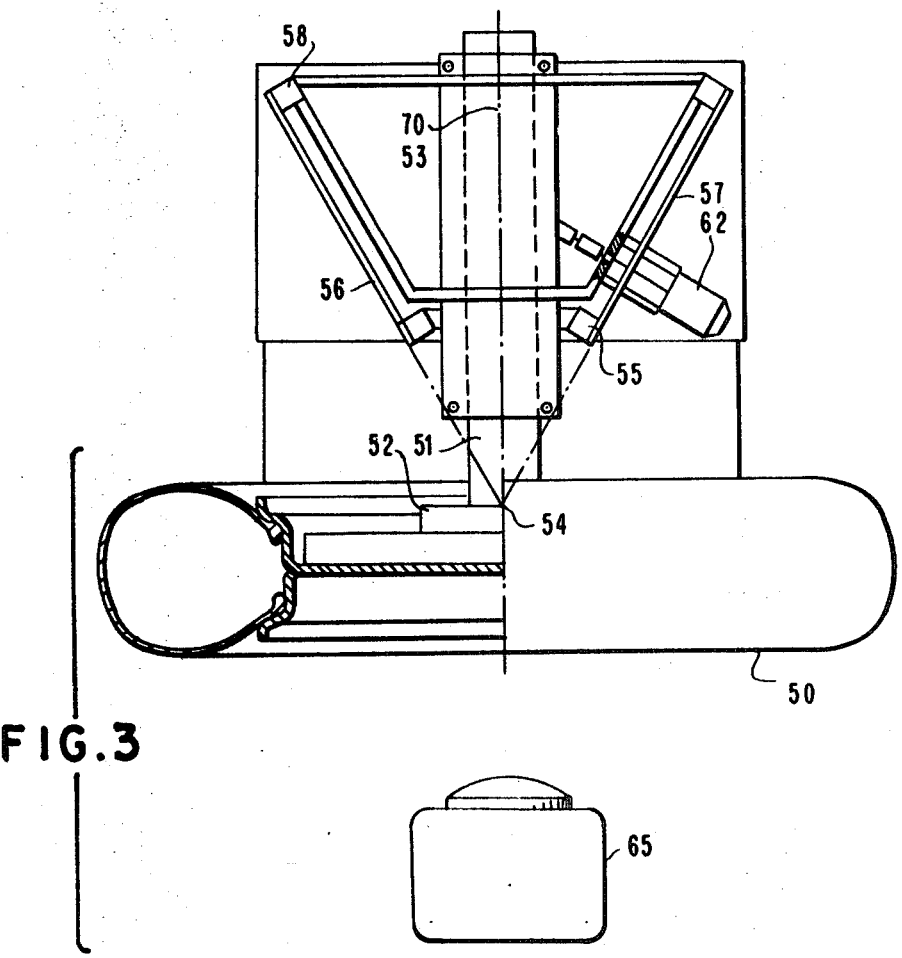
FIG. 3 is a schematic plan view of another embodiment of the balancing machine of the present invention.

In the embodiment of the present invention shown in FIGS. 3 and 4, the mounting of the body to be balanced is horizontally journalled and is supported by springs mounted tilted towards one another. These springs provide for a directionally limited rocking motion of the axis of rotation of the body to be balanced. These tilted springs are supported from parallel disposed springs which provide guidance for the parallel displacement of the axis of rotation of the body.

In this embodiment of the balancing machine of the present invention, a body to be balanced is mounted from a mounting plate 52 of a rotatably journalled horizontal spindle 51. The spindle 51 is journalled in ball bearings inside a bearing sleeve 53 to transmit to a sensor 62 the rocking motion of a shaft 70 (which is connected to the spindle 51), about the rocking intersection or axis 54. The bearing sleeve 53 is held fast in a rigid frame 55 which is supported by two leaf springs 56 and 57 that are inclined towards each other. The leaf springs 56 and 57 are connected to a console 58 which, in turn, rests on two vertical leaf springs 59 and 60 which are disposed parallel to each other. The parallel motions of the axis 70 are transmitted to a sensor 63 firmly mounted from a base plate 61 by a bracket 72. A frictional drive 64 or any suitable driving motor can be provided to rotate the spindle 51. Indication of the imbalance can be obtained by means of the systems shown in FIGS. 2 or 5, or by other suitable means, as will be readily apparent to an expert in the art. A suitable indication of the angular location of the imbalance can also be obtained simply by means of a separate stroboscope lamp, such as shown in FIG. 3 at 65.

Other suitable resilient members can be employed instead of the leaf springs shown in connection with the specific embodiments of the present invention. For example, torsion bars can be used, in which case, suitably, four torsion bars each can be substituted for each of the pairs of leaf springs. Combinations of various kinds of resilient members can also be suitably employed.

The balancing machines of the present invention can be constructed for the balancing of any body of any desired size; however, the machines of the present invention are particularly suited for the balancing of smaller bodies, such as wheels with or without tires thereon, grinding wheels, smaller flywheels, and the like.

I claim:

1. In a balancing machine having a mechanical frame for dynamically balancing a rotationally mounted body, means for rotationally mounting the body, first and second leaf spring pairs, said first leaf spring pair supporting said second leaf spring pair, and second leaf spring pair, in turn, supporting said mounting means, the leaf springs of said first leaf spring pair being disposed parallel to the rotational axis of the rotationally mounted body so as to guide the rotational axis of the body freely in parallel direction, the leaf springs of said second leaf spring pair being disposed at an inclination to one another and having longitudinal axes, respectively, whose extensions intersect in a plane of the body at which a counter-balancing force is applicable for balancing the body.

2. The balancing machine of claim 1 wherein the springs of said second leaf spring pair are supported by the springs of said first leaf spring pair in a 90° relative displacement between said spring pairs.

3. The balancing machine of claim 2 comprising a first sensor responsive to the dislocations of said first leaf spring pair, and a second sensor responsive to the dislocations of said second leaf spring pair, said first and said second sensors being mounted in a 90° relative displacement with regard to each other, for measuring the dislocations of said first and said second leaf spring pairs in a relative 90° shift.

4. The balancing machine of claim 3 comprising a computer system connected to the output of the first and second sensor for shifting by 90° the phase of the measure of the imbalances in the entire body to be balanced and for vectorially summarizing the measure of imbalances registered through the dislocations of said first and said second leaf spring pairs, whereby the result of the vectorial summation provides the measure of the magnitude and the angular position of the imbalances only in said last-mentioned plane.

5. The balancing machine of claim 4 comprising switch means adjustable to one position wherein it is connected to the output of the second sensor and wherein imbalances are measurable in all planes of the body to be balanced except in the plane in which said extensions of the longitudinal axes of the springs of said second pair of leaf springs intersect, and after equalization of the measured imbalances, said switch means being adjustable to another position wherein it is connected to the output of the computer system and wherein imbalances are measurable in said last-mentioned plane.

6. The balancing machine of claim 1 comprising means for mounting the body to be balanced with its axis of rotation in a horizontal position, and an intermediate mounting plate for supporting said second leaf spring pair, said intermediate mounting plate being supported from said first leaf spring pair.

References Cited

UNITED STATES PATENTS

| | | | |
|---|---|---|---|
| 2,177,252 | 10/1939 | Hanson | 73—473 |
| 2,618,776 | 11/1952 | Wiancito | 73—516 |
| 3,044,304 | 7/1962 | Ten Bosch et al. | 73—462 |
| 3,130,587 | 4/1964 | Kinsey et al. | 73—459 |

RICHARD C. QUEISSER, Primary Examiner

H. GOLDSTEIN, Assistant Examiner